United States Patent [19]
Reed et al.

[11] Patent Number: 5,753,820
[45] Date of Patent: May 19, 1998

[54] FLUID PRESSURE SENSING UNIT INCORPORATING DIAPHRAGM DEFLECTION SENSING ARRAY

[75] Inventors: Michael A. Reed, Chelmsford; Paul Franzosa, Arlington, both of Mass.

[73] Assignee: Arthur D. Little, Inc., Cambridge, Mass.

[21] Appl. No.: 736,869

[22] Filed: Oct. 25, 1996

[51] Int. Cl.$^6$ ............................ G01L 7/00; G01L 9/12
[52] U.S. Cl. ............................................. 73/706; 73/718
[58] Field of Search ..................... 73/706, 715, 716, 73/717, 718, 723, 724, 730, 756; 128/675, 748; 361/283

[56] References Cited

U.S. PATENT DOCUMENTS

| | | |
|---|---|---|
| 2,648,328 | 8/1953 | Hathaway et al. . |
| 2,796,863 | 6/1957 | von Wittern . |
| 3,215,135 | 11/1965 | Franke . |
| 3,572,319 | 3/1971 | Bittner et al. . |
| 4,226,124 | 10/1980 | Kersten . |
| 4,314,480 | 2/1982 | Becker . |
| 4,398,542 | 8/1983 | Cunningham et al. . |
| 4,581,940 | 4/1986 | Merrick et al. . |
| 4,683,894 | 8/1987 | Kodama et al. . |
| 4,741,214 | 5/1988 | Vidmantas ........................ 73/718 |
| 4,920,972 | 5/1990 | Frank et al. . |
| 4,974,117 | 11/1990 | Irwin ................................ 73/718 |
| 5,006,952 | 4/1991 | Thomas ............................ 73/718 |
| 5,165,281 | 11/1992 | Bell .................................. 73/718 |
| 5,392,653 | 2/1995 | Zanger et al. . |

*Primary Examiner*—William L. Oen
*Attorney, Agent, or Firm*—Arthur D. Little, Inc.

[57] ABSTRACT

A sensing unit includes a re-usable portion which is isolated from system fluids and a disposable portion. The disposable portion includes an enclosure that defines an internal cavity with one wall of the enclosure being constituted by a flexible diaphragm that is exposed to operating pressure of the system. The re-usable portion has mounted therein a sensing array at a position adjacent to a non-system pressure side surface of the diaphragm. The sensing array includes a plurality of sensing elements which are arranged as radial inner and outer sets with each set being adapted to preferentially sense a deflection of a central portion of the diaphragm. An output signal representative of the fluid pressure in the fluid system is established based on a ratio of deflection signals from the sets of sensing elements. Preferably, the sensing elements constitute capacitive plates that have equally exposed surface areas.

20 Claims, 1 Drawing Sheet

FLUID PRESSURE SENSING UNIT INCORPORATING DIAPHRAGM DEFLECTION SENSING ARRAY

BACKGROUND OF THE INVENTION

1. Field of the Invention

The present invention pertains to the art of pressurized fluid systems and, more particularly, to a sensing unit used for measuring fluid pressure in a system.

2. Discussion of the Prior Art

In various fields, it is desirable to measure the fluid pressure within a tube or system in order to control the level of that fluid pressure. For example, in the field of medicine, the pressure in systems used to deliver fluids to a patient and to withdraw fluids from a patient must often be accurately controlled. In such systems, it is common to incorporate a pressure sensing unit in fluid communication with the fluid medium either delivered to or withdrawn from the patient so that the fluid pressure can be periodically or continuously monitored for adjustment purposes. Such pressure sensing units can take various forms including: transducers for measuring the pressure directly; displacement sensors which actually sense the deflections of a member which is subjected to the pressure of the system; load cell sensors used to measure the force applied to a member by the system pressure; and position sensors that strictly determine the location of a deflectable member.

In order to obtain reliable information from a pressure sensing unit, the unit must be accurately calibrated. In known sensing arrangements, the unit must actually be periodically calibrated to maintain its accuracy. Since the units are generally quite sensitive to the particular environment in which they are utilized, it is also often required to perform the calibration process in situ. In other words, the sensing unit would typically have to be first incorporated in the overall fluid system and then calibrated. In situ calibration is particularly required in connection with sensing units which are used to determine an operating pressure based on the sensed position or deflection of a pressure responsive member. Under these circumstances, the distance between the sensing unit and the pressure responsive member at initial, static conditions, either due to manufacturing tolerances or actual bowing of the pressure responsive member, will generally affect the resulting pressure measurements.

In certain environments, this requirement of in situ calibration is not really considered problematic. This is particularly true in systems which operate uninterrupted for considerable lengths of time and are not disassembled following their use. However, in numerous other fields wherein an entire fluid pumping system, or at least a substantial portion thereof, needs to be replaced following its use, continual re-calibration of the sensing unit can be time consuming and costly. This is particularly evident in the medical field wherein, due to potential contamination purposes, major portions of body fluid pumping systems need to be disposed of or, at minimum, sanitized after each use.

Based on the above, there exists a need in the art for a sensing unit which can be used to accurately measure the movement of a pressure responsive member in a fluid system and which is essentially insensitive to relative distance variations between the pressure responsive member and the sensing unit upon assembly of the sensing unit to the remainder of the system. In addition, there exists a need for such a sensing unit which can be either readily calibrated or which need not be calibrated in situ.

SUMMARY OF THE INVENTION

In accordance with the invention, a sensing unit includes a reusable portion which is isolated from system fluids and a disposable portion. The disposable portion includes an enclosure that defines an internal cavity with one wall of the enclosure being constituted by a flexible diaphragm. The enclosure is formed with at least one input port which subjects a first side surface of the diaphragm to operating pressure of the system.

The re-usable portion has mounted therein a sensing array at a position adjacent to a second side surface of the diaphragm. The sensing array includes a plurality of sensing elements which are arranged in sets. At least two sets of sensing elements are provided with each set being adapted to preferentially sense a movement of a center portion of the diaphragm resulting from a flow of fluid into the internal cavity through the inlet port. The signals received from each of the sets of sensing elements are used to determine an output signal representative of the fluid pressure in the internal cavity and, correspondingly, in the overall fluid system.

In accordance with a preferred embodiment of the invention, the sensing elements constitute capacitive plates which are arranged as inner and outer sets of plates. The plate sets are arranged in parallel and are radially spaced and insulated from each other. A ratio of the signals from the plate sets are utilized to determine the resulting pressure output signal, while remaining insensitive to variations in mounting position from the diaphragm.

With this arrangement, the sensing unit is generally insensitive to the distance established between the plates and the diaphragm and only requires a limited range of zero offset calibration. In addition, the disposable portion of the sensing unit can be made at minimal cost, preferably with a plastic section and a metallic diaphragm, and sealed to the remainder of the sensing unit, such as through the use of an 0-ring.

Additional features and advantages of the fluid pressure sensing unit of the invention will become more readily apparent from the following description of preferred embodiments thereof when taken in conjunction with the drawings wherein like reference numerals refer to corresponding parts in the several views.

DETAILED DESCRIPTION OF THE PREFERRED EMBODIMENTS

Figure 1:
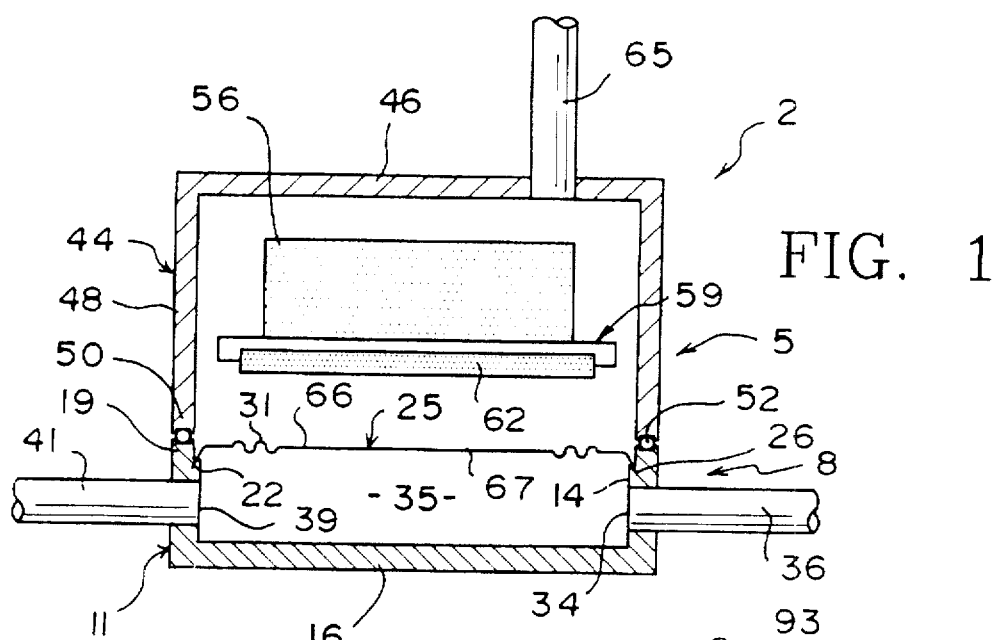
FIG. 1 is a partial cross-sectional and schematic view of a sensing unit constructed in accordance with a first embodiment of the invention.

With initial reference to FIG. 1, a fluid pressure sensing unit constructed in accordance with the present invention is generally indicated at 2. Fluid pressure sensing unit 2 includes a reusable portion 5 and a disposable portion 8. Disposable portion 8 is constituted by an enclosure 11 including an annular side wall 14 and a base 16. Annular side wall 14 terminates in an upper annular rim 19 that also includes a lower ledge 22. Enclosure 11 is also formed in part by a flexible diaphragm 25 having an outer edge portion 26 that is secured at lower ledge 22 to annular side wall 14.

In the preferred embodiment, flexible diaphragm 25 is formed of stainless steel and includes a corrugated portion 31. Of course, other electro-conductive materials could also be used in forming diaphragm 25 without departing from the spirit of the invention.

Enclosure 11 is provided with an inlet port 34 to enable fluid to flow into an internal cavity 35 defined within enclosure 11. As shown, a conduit 36 is positioned at inlet port 34 and enclosure 11 also includes an outlet port 39 that which is attached to conduit 41. With this construction, pressurized fluid from a system (negatively pressurized fluid, i.e., at less than atmospheric pressure in the preferred embodiment) can enter internal cavity 35 through conduit 36 and inlet port 34 and that pressurized fluid can act upon flexible diaphragm 25 to deflect the same. The fluid can flow through internal cavity 35 and out outlet port 39 and conduit 41. Of course, the higher the pressure of the fluid medium that enters internal cavity 35, the larger the amount of deflection of flexible diaphragm 25.

Reusable portion 5 of fluid pressure sensor unit 2 is shown to include a housing 44 that is defined by an end wall 46 and an annular side wall 48. Annular side wall 48 has a terminal annular end 50 which is adapted to be sealingly attached to upper rim 19 of enclosure 11 through the use of a O-ring 52. In the embodiment illustrated, housing 44 has mounted therein an electronic control unit 56 that supports, through structure generally indicated at 59, a sensor 62 which is adapted to sense the movement or deflection of flexible diaphragm 25 that results from a flow of fluid into internal cavity 35 as discussed above. In the preferred embodiment, sensor 62 constitutes a capacitive sensing array as will be more fully discussed below. A conduit 65 also leads into housing 44 as illustrated in this figure. Conduit 65 can be used to provide an initial setting pressure within housing 44 which acts against one side 66 of flexible diaphragm 25. Of course, this will be counteracted by the force acting upon a second side 67 of flexible diaphragm 25 by the pressure provided within the internal cavity 35. As will also be more fully discussed below, conduit 65 is provided for potential calibration purposes.

Figure 2:
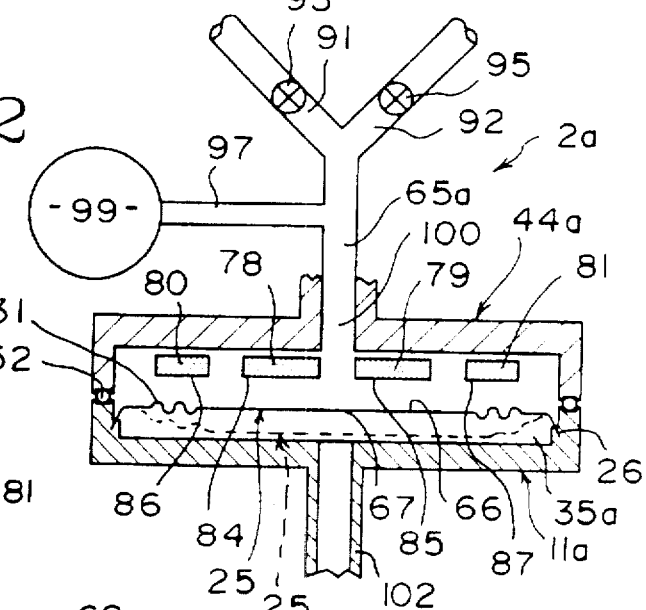
FIG. 2 is a partial cross-sectional and schematic view of a sensing unit constructed in accordance with a second embodiment of the invention.
Figure 3:
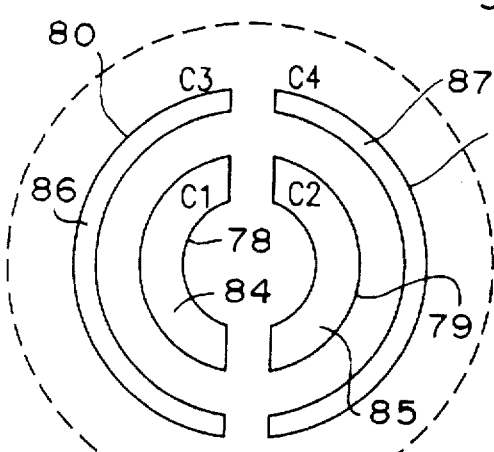
FIG. 3 is a frontal view of a capacitive sensing array incorporated in the sensing unit of the invention.

Reference will now be made to FIGS. 2 and 3 in providing additional details about the structure described above, while also presenting a second fluid pressure sensing unit embodiment constructed in accordance with the present invention. As much of the structure in the second embodiment is identical to that presented in the first embodiment, like reference numerals will be used to refer to corresponding parts. As mentioned above, sensor 62 preferably comprises a capacitive sensing array. This sensing array is illustrated as being comprised of first, second, third and fourth capacitive plates 78–81, each of which has a respective surface 84–87 that is exposed to side 66 of flexible diaphragm 25. Capacitive plates 78–81 are arranged in sets with each set including at least two capacitive plates. In the preferred embodiment shown, only two sets of sensing elements are illustrated with capacitive plates 78 and 79 constituting a first set and capacitive plates 80 and 81 constituting a second set. As flexible diaphragm 25 is made of metal, the deflection of flexible diaphragm 25 towards or away from capacitive plates 78–81 will affect the sensed capacitance that is signaled to electronic control unit 56. These signals will generally be in the form of a voltage with the capacitive plates 78–81 having a predetermined voltage-to-pressure per square inch (psi) setting. Since capacitive plates 78 and 79 are located towards the center of flexible diaphragm 25, they will obviously observe a much large deflection and therefore will have a correspondingly larger capacitance signal as the closer flexible diaphragm 25 comes to capacitive plates 78–81, the signaled capacitance is increased.

Figure 4:
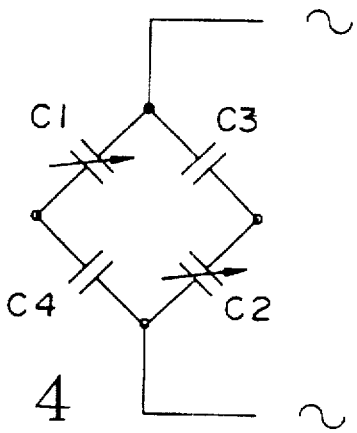
FIG. 4 is a schematic circuit representation of the sensing array of FIG. 3.

This arrangement is also clearly illustrated in FIG. 3 wherein capacitive plates 78 and 79 are located radially inwardly of capacitive plates 80 and 81. In addition, in accordance with the preferred embodiment, the exposed surfaces 84–87 of capacitive plates 78–81 have equal areas in order to establish commensurate compacitive potential between each of capacitive plates 78–81. The deflection signals outputted by the first and second sets of capacitive plates 78, 79 and 80, 81 are presented to electronic control unit 56 as mentioned above and electronic control unit 56 (not shown in FIG. 2 for clarity of the drawing) then determines a fluid pressure level in internal cavity 35 based on these deflection signals. Obviously, the fluid pressure level in internal cavity 35 corresponds to the overall system pressure. In accordance with the invention, the determined fluid pressure level is presented as an output signal that is established as a ratio of the deflection signals received from the first and second sets of sensing elements. As illustrated in the schematic of FIG. 4, these signals are presented at electronic control unit 56 in a parallel signaling manner.

The use of the two sets of capacitive plates 84, 85 and 86, 87 arranged with different radii as shown in FIG. 3, allows the ratio of the capacitive measurements to be very sensitive to the bowing of the center portion of diaphragm 25. As represented by the dotted line in FIG. 2, very little deflection of diaphragm 25 occurs adjacent edge portion 26 but rather large amounts of movement can occur at the center portion of diaphragm 25. However, the position of the capacitive plates due to mounting variations on the disposable portion 8 of the fluid pressure sensing unit 2 causes minimal changes in the capacitance ratio since both sets of plates 84, 85 and 86, 87 are affected relatively equally. This allows the sensing unit 2 to be assembled with minimal zero shift in the electronic signal output while maintaining full sensitivity to pressure induced deformation of the diaphragm 25. The corrugated diaphragm 25 has a large linear motion of its center for pressure differentials applied across it which makes it well suited to work with the capacitive plate array sensor system.

This arrangement of inner and outer sensing elements and the establishment of a pressure indicative signal based on a ratio of the deflection signals received from the first and second sets of sensing elements has been found to be extremely advantageous in providing a pressure sensing unit which can accurately determine system pressure without requiring in situ calibration. More specifically, since capacitive plates 78–81 are arranged as inner and outer sets of sensing elements, sensor 62 is relatively insensitive to the initially established distance between sensor 62 and flexible diaphragm 25. However, capacitive sensor 62 is extremely sensitive to bowing of flexible diaphragm 25. Due to the parallel plate arrangement and the taking of ratio signals from the radial inner and outer capacitive plates 78, 79 and 80, 81, extremely true and accurate overall deflection signals are inputted to electronic control unit 56 and each of these signals is utilized by the control unit in determining the system fluid pressure representative output signal. This entire arrangement enables disposable portion 8 to be manufactured with higher manufacturing tolerances given that an exactly consistent distance between sensor 62 and flexible diaphragm 25 at initial assembly of fluid pressure sensing unit 2 is not critical. Utilizing metal as the material for flexible diaphragm 25 is also advantageous since such a metal diaphragm would have associated therewith a low hysteresis effect.

In general, the arrangement of the various sensing elements of sensor 62 and the fact that multiple deflection signals taken from radially spaced locations along flexible diaphragm 25 enables the system fluid pressure representative signal to be more accurately determined, basically regardless of the distance between sensor 62 and flexible diaphragm 25 following assembly of disposable portion 8 to reusable portion 5. Given this insensitivity, fluid pressure sensing unit 2 need not be calibrated over its full range in situ every time a new disposable portion 8 is attached to reusable portion 5. However, for selective or periodic calibration purposes, housing 44a of fluid pressure sensing unit 2a includes a conduit 65a that is bifurcated into branch conduits 91 and 92. Each branch conduit 91, 92 is provided with a respective flow control valve 93, 95. Branch conduit 91 is preferably open to atmosphere downstream of valve 93 and branch conduit 92 is connected to a pressure source (not shown). Conduit 65a also has stemming therefrom an auxiliary conduit 97 that leads to a pressure transducer 99.

The pressure source attached to branch conduit 92 can take various forms, however, in the preferred embodiment, a positive pressure source is provided. With this arrangement, the pressure source can act on side 66 of flexible diaphragm 25 through, in this embodiment, a central port 100, to push flexible diaphragm 25 away from the capacitive plates 78–81. This pressure can be read by pressure transducer 99 and used to calibrate sensor 62 by correlating the pressure determined by pressure transducer 99 to the output signal determined by electronic control unit 56 based on signals received from the sets of capacitive plates 78, 79 and 80, 81. Thereafter, second flow control valve 95 can be closed and first flow control valve 93 opened to re-establish a normal operating pressure in housing 44a.

Based on the above, it should be readily apparent that the only real difference between the embodiments represented in FIGS. 1 and 2 is the location of conduit 65 as compared to conduit 65a and also the fact that internal cavity 35 receives a flow which is tangential to flexible diaphragm 25 whereas internal cavity 35a is exposed to system pressure by means of at least one conduit 102 which is arranged generally perpendicular to side 67 of flexible diaphragm 25. In any event, with respect to the arrangement of the sensing elements and the manner in which the representative system fluid pressure signal is determined, these embodiments function in an identical manner.

Although described above with respect to preferred embodiments of the invention, it should be readily understood that various changes and/or modifications can be made to the invention without departing from the spirit thereof. For example, although only two sets of sensing elements are presented in the preferred embodiments shown and described, additional sets could also be utilized. In addition, although a ratio of the signals received from the first and second sets of capacitive plates 78, 79 and 80, 81 is preferably utilized in establishing the representative system fluid pressure signal, this representative signal could be determined based on a function of the signals received from each of the sets of capacitive plates 78, 79 and 80, 81. Furthermore, other types of movement/deflection sensors could also be utilized without departing from the spirit of the invention. In general, the invention is only intended to be limited by the scope of the following claims.

We claim:

1. A fluid pressure sensing unit comprising:
    an enclosure defining an internal cavity, said enclosure having at least one wall portion formed from a flexible diaphragm, said diaphragm having first and second sides with said first side being exposed to the internal cavity, said enclosure including at least one fluid port opening into said internal cavity;
    a sensing array positioned adjacent the second side of said diaphragm, said sensing array including a plurality of sensing elements arranged in at least first and second sets, each of said first and second sets of sensing elements being adapted to sense a movement of a portion of said diaphragm resulting from fluid entering said internal cavity through said at least one fluid port; and
    a control unit for receiving input signals from said first and second sets of sensing elements and for developing, from said input signals, an output signal representative of a fluid pressure in said internal cavity.

2. The fluid pressure sensing unit according to claim 1, wherein each of said sensing elements comprises a capacitive sensor.

3. The fluid pressure sensing unit according to claim 2, wherein said first set of sensing elements is connected to said control unit in parallel with respect to said second set of sensing elements.

4. The fluid pressure sensing unit according to claim 4, wherein each of said capacitive sensors has an equal surface area that is exposed to the second side of said diaphragm.

5. The fluid pressure sensing unit according to claim 1, wherein said first and second sets of sensing elements are arranged as radial inner and outer sets of sensing elements.

6. The fluid pressure sensing unit according to claim 5, wherein each of said sensing elements comprises a capacitive plate.

7. The fluid pressure sensing unit according to claim 6, wherein said first set of sensing elements has an associated, exposed surface area that is equal to an exposed surface area associated with said second set of sensing elements.

8. The fluid pressure sensing unit according to claim 1, wherein said output signal is based on a ratio of the input signals received from said first and second sets of sensing elements.

9. The fluid pressure sensing unit according to claim 1, wherein said enclosure is formed of plastic.

10. The fluid pressure sensing unit according to claim 9, wherein said diaphragm is formed of metal.

11. The fluid pressure sensing unit according to claim 1, further comprising a housing within which said sensing array is mounted, said housing being adapted to be sealingly attached to said enclosure.

12. The fluid pressure sensing unit according to claim 11, further comprising an O-ring positioned between said housing and said enclosure.

13. The fluid pressure sensing unit according to claim 11, further comprising:
    a fluid inlet opening into said housing;
    means for altering a pressure level in said housing through said fluid inlet; and
    a transducer for sensing the pressure level in said housing.

14. The fluid pressure sensing unit according to claim 13, wherein said fluid inlet is bifurcated into a pair of branch conduits and said pressure level altering means includes a pair of flow control valves, each of said flow control valves being arranged in a respective one of said branch conduits.

15. A method of sensing a pressure level in a fluid system comprising:
    providing an enclosure having at least one wall portion formed from a flexible diaphragm;
    positioning a sensing array, including a plurality of sensing elements arranged in at least first and second sets, adjacent said flexible diaphragm;

exposing an internal cavity of the enclosure to the pressure level in the fluid system to cause said flexible diaphragm to deflect;

sensing a deflection of a portion of the flexible diaphragm with each of said first and second sets of sensing elements; and determining the fluid pressure level in said system based on deflection signals received from said first and second sets of sensing elements.

16. The method of sensing a pressure level in a fluid system according to claim 15, further comprising: utilizing capacitive sensors for each of said sensing elements.

17. The method of sensing a pressure level in a fluid system according to claim 15, further comprising: arranging said first and second sets of sensing elements as radially inner and outer sets of sensing elements.

18. The method of sensing a pressure level in a fluid system according to claim 15, further comprising: establishing said output signal as a ratio of the deflection signals received from said first and second sets of sensing elements.

19. The method of sensing a pressure level in a fluid system according to claim 15, further comprising: providing said first and second sets of sensing elements with equivalent amounts of surface area exposed to said flexible diaphragm.

20. The method of sensing a pressure level in a fluid system according to claim 15, further comprising: disposing of said enclosure following a depressurization of the fluid system.

* * * * *